United States Patent
Fan et al.

(10) Patent No.: US 10,637,978 B2
(45) Date of Patent: Apr. 28, 2020

(54) MOBILE TERMINAL AND ELECTRONIC APPARATUS

(71) Applicant: GUANGDONG OPPO MOBILE TELECOMMUNICATIONS CORP., LTD., Dongguan, Guangdong (CN)

(72) Inventors: Xiaoyu Fan, Guangdong (CN); Zhengshan Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/202,675

(22) Filed: Nov. 28, 2018

(65) Prior Publication Data

US 2019/0253534 A1 Aug. 15, 2019

(30) Foreign Application Priority Data

Feb. 9, 2018 (CN) .................... 2018 2 0234852 U

(51) Int. Cl.
*H04M 1/02* (2006.01)
*G06F 1/16* (2006.01)

(52) U.S. Cl.
CPC .......... *H04M 1/026* (2013.01); *G06F 1/1686* (2013.01); *H04M 1/0237* (2013.01); *H04M 1/0264* (2013.01); *H04M 1/0266* (2013.01); *H04M 1/0277* (2013.01)

(58) Field of Classification Search
CPC .. H04M 1/026; H04M 1/0264; H04M 1/0266; H04M 1/0277
See application file for complete search history.

(56) References Cited

U.S. PATENT DOCUMENTS

2018/0262663 A1  9/2018  Zhang

FOREIGN PATENT DOCUMENTS

| CN | 104660753 A | 5/2015 |
|---|---|---|
| CN | 105049686 A | 11/2015 |
| CN | 106572214 A | 4/2017 |
| CN | 106713549 A | 5/2017 |
| CN | 106850896 A | 6/2017 |
| CN | 207926662 U | 9/2018 |
| EP | 2136538 A1 | 12/2009 |
| EP | 2549719 A1 | 1/2013 |
| EP | 3255867 A1 | 12/2017 |

OTHER PUBLICATIONS

Extended European Search Report, dated May 24, 2019; Appln. No. 18208539.9.
International search report,PCT/CN2018/117497, dated Feb. 12, 2019 (11 pages).

*Primary Examiner* — Sam Bhattacharya

(57) ABSTRACT

A mobile terminal, including a housing including a front, rear, left and right side faces and a top face, a receiving groove may be defined on the top face along a left-right direction and between the front and rear side faces, the receiving groove may extend to and penetrate the left and right side faces; a mainboard arranged in the housing; a screen arranged on the front side face; and a mounting frame; a side face of the mounting frame facing the screen may be provided with a first camera connected to the mainboard, a side face of the mounting frame facing away from the screen may be provided with a second camera exposed out of the housing, the mounting frame may be configured to extend out of or retract into the receiving groove, such that the first camera may be exposed out of or hidden into the housing.

20 Claims, 13 Drawing Sheets

MOBILE TERMINAL AND ELECTRONIC APPARATUS

CROSS REFERENCE TO RELATED APPLICATIONS

This application claims priorities to Chinese Patent Application No. 201820234852.0, filed on Feb. 9, 2018, the contents of which are herein incorporated by reference in their entireties.

TECHNICAL FIELD

The described embodiments relate to the technical field of mobile terminals.

BACKGROUND

An existing mobile terminal, such as, a mobile phone, a tablet PC, etc., is usually provided at a front side face thereof with such electronic devices as a front lens assembly, an earpiece assembly, a light-ray sensor and the like. In order to pursue a better visual experience, full-screen mobile phones have become a new trend with the development of mobile phones. However, the front lens set, the earpiece assembly, the light-ray sensor and the like on the front side face of an existing full-screen mobile phone will occupy space of the front side face of the mobile terminal, thereby limiting an increasing of a screen ratio of the mobile phone.

SUMMARY OF THE DISCLOSURE

According to an aspect of the present disclosure, a mobile terminal may be provided. The mobile terminal may include a housing, a mainboard, a screen and a mounting frame. The housing may include a front side face, a rear side face, a left side face, a right side face opposite to the left side face, and a top face. A receiving groove may be defined on the top face of the housing along a left-right direction and located between the front side face and the rear side face, the receiving groove may extend to the left side face and the right side face and penetrate the left side face and the right side face. The mainboard may be arranged in the housing. The screen may be arranged on the front side face of the housing and connected to the mainboard. A side face of the mounting frame facing the screen may be provided with a first camera connected to the mainboard, a side face of the mounting frame facing away from the screen may be provided with a second camera exposed out of the housing, the mounting frame may be configured to extend out of or retract into the receiving groove, such that the first camera may be exposed out of or hidden into the housing.

According to another aspect of the present disclosure, a mobile terminal may be provided. The mobile terminal may include a back shell defining an accommodating opening on a top of the back shell, a front shell including a pair of spaced and parallel walls engaged with the back shell to define a chamber, a mainboard received in the chamber, a screen embedded in the front shell and having a display area, a slidable device received in the storage space and configured to move between a first position at which the slidable device extends out of the storage space and a second position at which the slidable device retracts into the storage space, and a driving mechanism connected to the mainboard, received in the chamber and configured to drive the slidable device with the first and second cameras to move between the first position and the second position. The front shell may have a top connected with the walls and lower than a top of the back shell. The top of the front shell may be lower than the top of the screen, such that a storage space may be defined by a top of the front shell, the screen and the back shell, the chamber and the storage space may be divided by the top of the housing. A first camera may be arranged on a face of the slidable device facing the screen and connected with the mainboard, when the slidable device is at the first position, the first camera may be exposed out of the storage space; when the slidable device is at the second position, the slidable device may be covered by the display area and the first camera is received in the storage space. A second camera is arranged on a face of the slidable device facing the back shell and connected to the mainboard, when the slidable device is at the first position, the second camera may be exposed out of the storage space, when the slidable device is at the second position, the second camera may be accommodated in the accommodating opening and exposed out of the back shell through the accommodating opening.

According to another aspect of the present disclosure, an electronic apparatus may be provided. The electronic apparatus may include a housing including a pair of spaced and parallel walls and a top connected with the walls, a screen engaged with the walls to define a chamber and having a top extending beyond the top of the housing such that a storage space is defined by the top of the housing and the screen, a mainboard received in the chamber, a screen embedded in the front shell and having a display area and a slidable device received in the storage space and configured to move between a first position at which the slidable device may extend out of the storage space and a second position at which the slidable device may retract into the storage space. The top of the front shell may be lower than the top of the screen, such that a storage space may be defined by a top of the front shell, the screen and the back shell, the chamber and the storage space may be divided by the top of the housing. A first camera may be arranged on the slidable device and connected to the mainboard, when the slidable device is at the first position, the first camera is exposed out of the storage space; when the slidable device is at the second position, the slidable device may be covered by the display area and the first camera is received in the storage space. A second camera may be arranged on a face of the slidable device facing away from the screen and connected to the mainboard, the second camera may be exposed out of the housing regardless of whether the slidable device is at the first position or the second position.

BRIEF DESCRIPTION OF THE DRAWINGS

In order to more clearly illustrate the technical solutions in the embodiments of the present disclosure, a brief introduction will be made below to the drawings required to be used in the embodiments. Evidently, the drawings in the following description are only some embodiments of the present disclosure. A person of ordinary skilled in the art can further obtain other drawings without any creative work according to these drawings.

DETAILED DESCRIPTION

A clear and complete description of the technical solutions in the embodiments of the present disclosure will be given below in conjunction with the accompanying drawings in the embodiments of the present disclosure. Apparently, the embodiments described below are merely a part of the embodiments of the present disclosure, rather than all of the embodiments. All other embodiments obtained by a person of ordinary skilled in the art without creative efforts on the basis of the embodiments of the present disclosure shall fall within the protection scope of the present disclosure.

In the description of the embodiments of the present disclosure, it should be understood that, orientation or position relations denoted by the terms "on/upper", "below/lower", "left", "right" and the like, which are orientation or position relations shown on the basis of the accompanying drawings, are merely intended to facilitate describing the present disclosure in a concise manner, rather than suggest or show that the devices or elements referred to must have particular orientation and must be constructed and operated with particular orientation. Thus, the above terms shall not be construed as limiting the present disclosure.

Figure 1:
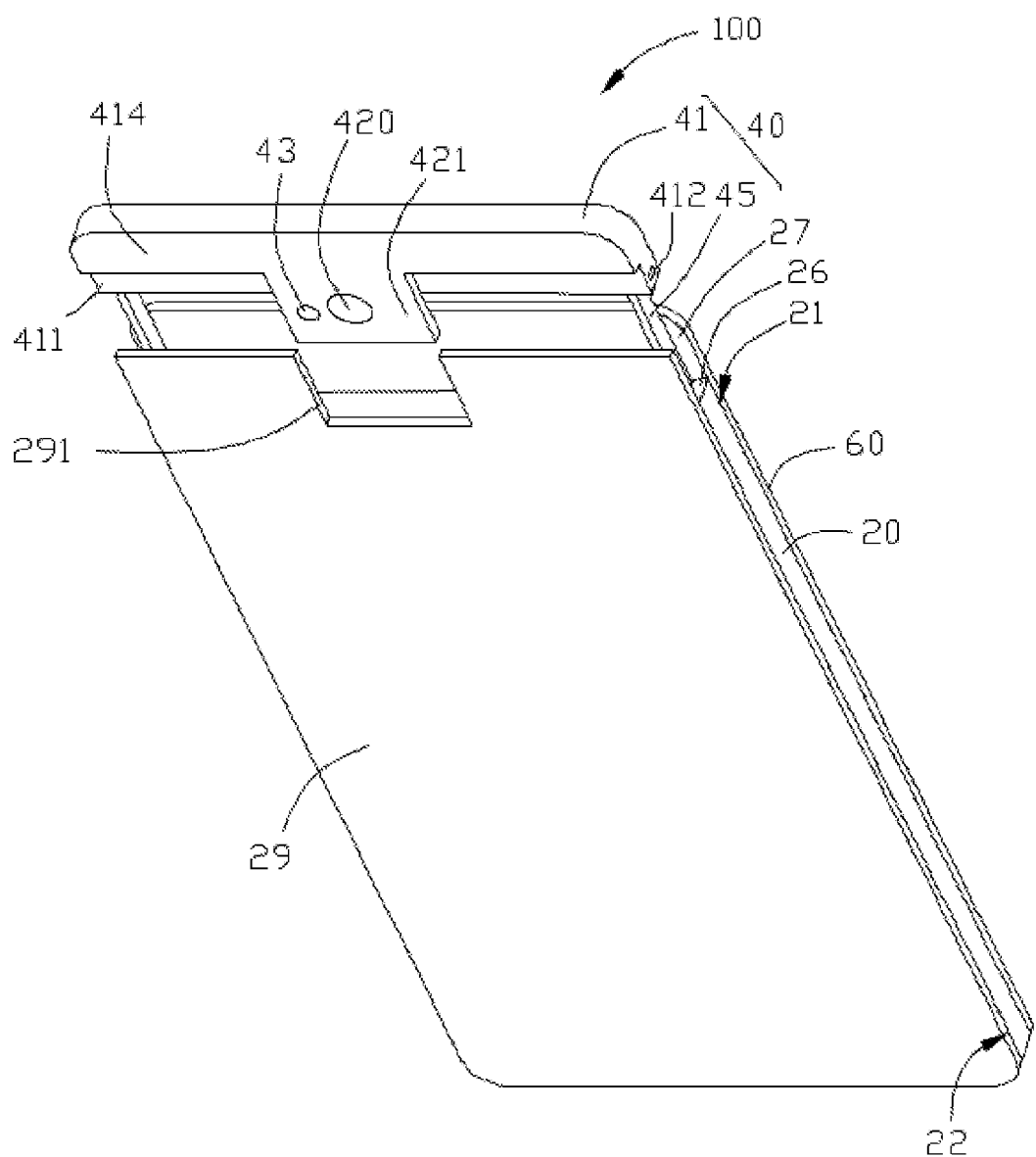
FIG. 1 is a perspective view of a mobile terminal according to a first embodiment of the present disclosure.
Figure 2:
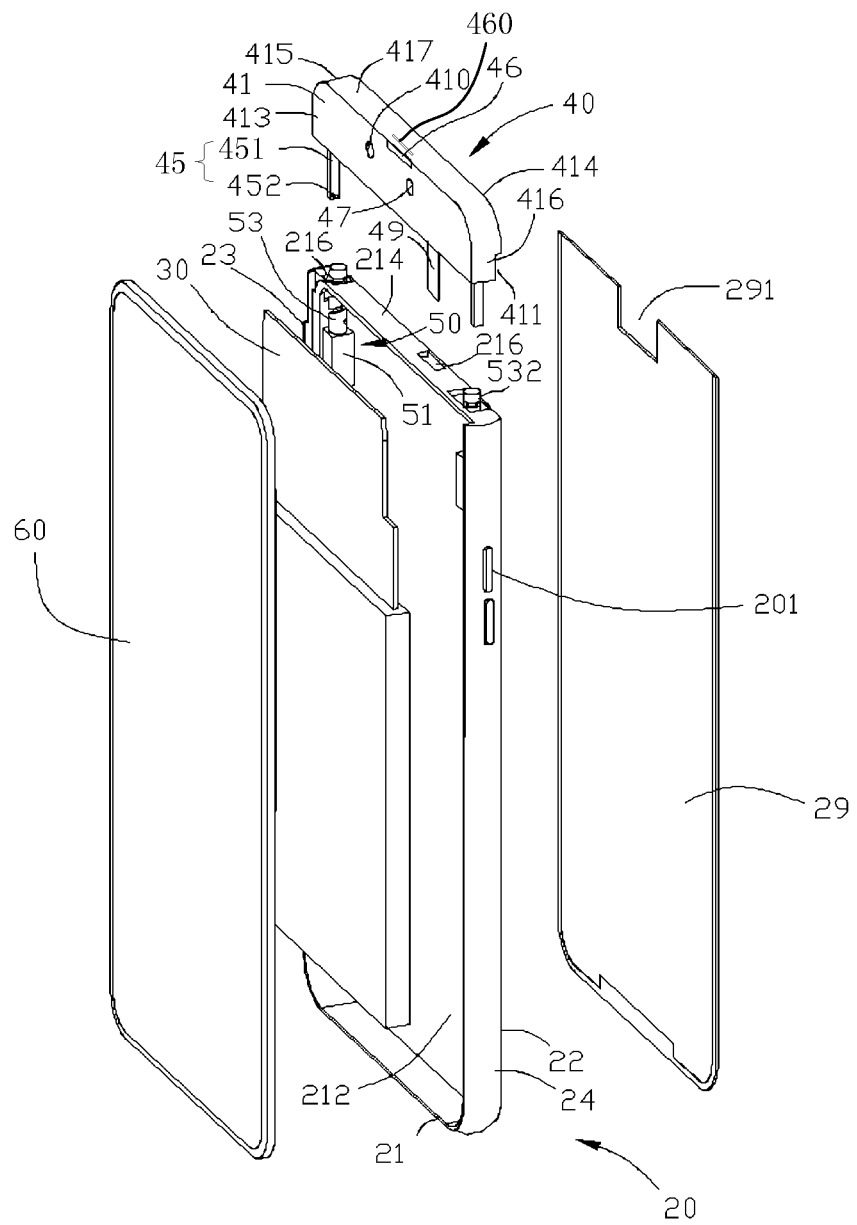
FIG. 2 is an exploded view showing another perspective of the mobile terminal of FIG. 1.
Figure 3:
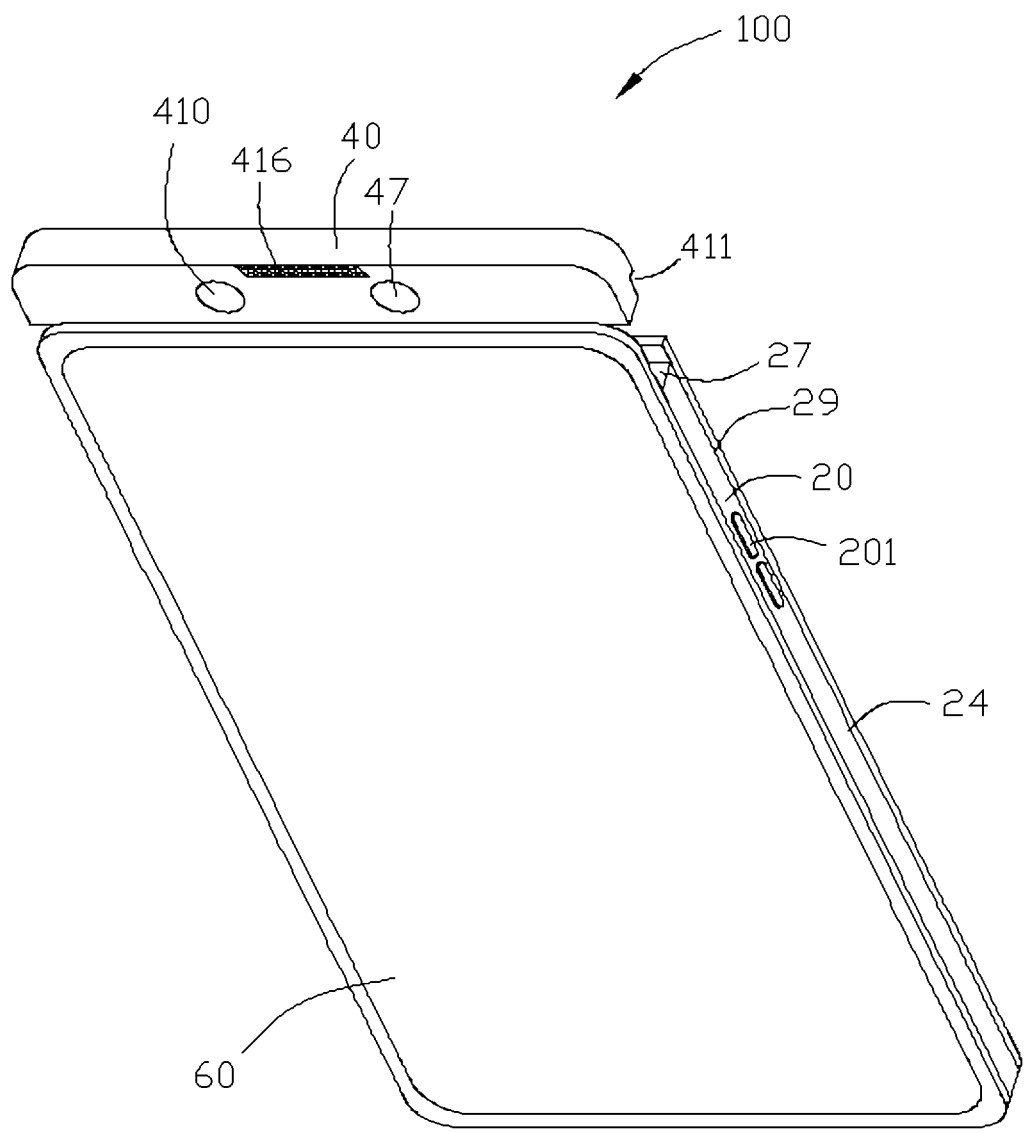
FIG. 3 is a perspective view showing another perspective of the mobile terminal of FIG. 1.

Referring to FIGS. 1 to 3, perspective view of a mobile terminal according to a first embodiment of the present disclosure, an exploded view showing another perspective of the mobile terminal of FIG. 1 and a perspective view showing another perspective of the mobile terminal of FIG. 1 are depicted. The present disclosure provides a mobile terminal 100, including: a housing 20, a mainboard 30 arranged in the housing 20, and a screen 60 connected to the mainboard 30. The housing 20 may include a front side face 21, a rear side face 22 opposite to the front side face 21, a left side face 23, a right side face 24 opposite to the left side face 23, and a top face 26. The screen 60 may be arranged on the front side face 21 of the housing 20. A receiving groove 27 along a left-right direction may be defined on the top face 26 between the front side face 21 and the rear side face 22 of the housing 20. The receiving groove 27 may extend to the left side face 23 and the right side face 24 and penetrate the left side face 23 and the right side face 24 of the housing 20. The mobile terminal 100 may further include a mounting frame 40. A first camera 410 connected to the mainboard 30 may be arranged on a side face of the mounting frame 40 facing the screen 60. A second camera 420 may be arranged on the other side face of the mounting frame 40 facing away from the screen 60 and exposed out of the housing 20. The mounting frame 40 may be configured to extend out of or retract into the receiving groove 27, such that the first camera 410 may be exposed out of or hidden into the housing 20. In an embodiment, the mobile terminal 100 may be a mobile phone. It can be understood that, in other embodiments, the mobile terminal can also be a satellite; a cellular phone; a personal communications system (PCS) terminal combining a cellular radiophone with data processing, fax and data communication capacity; a PDA including a radiophone, a pager, internet/intranet access, a Web browser, a notebook, a calendar and/or a global positioning system (GPS) receiver, a conventional laptop and/or palmtop receiver, or other electronic device including a radiophone transceiver, which is not limited herein.

In the present embodiment, the housing 20 may be a middle frame of the mobile terminal 100. The receiving groove 27 may be defined on a top face of the middle frame and penetrates through a left side face and a right side face of the middle frame along a left-right direction. The mobile terminal 100 may further include a driving device 50 configured to drive the mounting frame 40 to slide, such that the mounting frame 40 extend out of or retract into the receiving groove 27. Connection between the first camera 410 and the mainboard 30, and connection between the second camera 420 and the mainboard 30 are electrical connection and signal connection. In the present embodiment, the front side face of the housing 20 may refer to a face facing the screen 60, and the rear side face may refer to a face facing away from the screen 60.

The top face 26 of the housing 20 of the mobile terminal 100 may define the receiving groove 27 at a rear side of the screen 60. The driving device 50 may drive the mounting frame 40 to extend out of or retract into the receiving groove 27, such that the first camera 410 on the mounting frame 40 could be exposed out of or hidden into the housing 20. When the first camera 410 is required to be used, the driving device 50 may drive the mounting frame 40 to extend out of the receiving groove 27, and a lighting face of the first camera 410 will not be blocked by other parts of the mobile terminal 100, so as to facilitate the user in using the first camera 410. When the first camera 410 is not required to be used, the driving device 50 may drive the mounting frame 40 to retract into the receiving groove 27, such that the first camera 410 may be hidden into the receiving groove 27. In the process that the mounting frame 40 extends out of or retracts into the receiving groove 27, the second camera 420 may be always exposed out of the housing 20, so as to facilitate the user in using the second camera 420. Since both the first camera 410 and the second camera 420 are provided on the mounting frame 40 and the mounting frame 40 can be received in the receiving groove 27, the first camera 410 and the second camera 420 may not occupy any area of the screen 60 of the mobile terminal 100, thereby making it possible to increase a screen ratio of the mobile terminal 100 up to 85% or more, even up to 95% or more, and thus improving the visual experience.

The housing 20 may further include a back panel 29 provided on the rear side face 22 of the housing 20. An orthogonal projection of a top face of the back panel 29 on the rear side face of the screen 60 may be lower than the top face of the screen 60. The back panel 29 and the screen 60 may define the receiving groove 27. The mounting frame 40 may define an accommodating groove 411 at the bottom of the side face facing away from the screen 60. When the mounting frame 40 retracts into the receiving groove 27, a top of the back panel 29 may be accommodated in the accommodating groove 411, and the second camera 420 may be exposed out of the back panel 29. In the present embodiment, the back panel 29 may be detachably connected to the housing 20, and the receiving groove 27 may extend to a rear side face of the screen 60 and a front side face of the back panel 29.

An accommodating opening 291 may be defined on the top of the back panel 29 along an extending-retracting direction of the mounting frame 40. The accommodating opening 291 may penetrate a rear side face of the back panel 29, and may be in communication with the receiving groove 27. When the mounting frame 40 retracts into the receiving groove 27, the second camera 420 could be accommodated in the accommodating opening 291, and may be exposed out of the back panel 29 through the accommodating opening 291. In an embodiment, the accommodating opening 291 may be defined at a middle position of the top face of the back plate 29.

An extension block 421 may be arranged on the side face of the mounting frame 40 facing away from the screen 60. The extension block 421 could be accommodated in the accommodating opening 291. The second camera 420 may be arranged on the extension block 421. When the mounting frame 40 retracts into the receiving groove 27, the extension block 421 may be accommodated in the accommodating opening 291, such that the second camera 420 could be exposed out of the back panel 29 through the accommodating opening 291, thereby facilitating the user in using the second camera 420. Since the extension block 421 is arranged on the mounting frame 40, and the second camera 420 is mounted on the extension block 421, only a partial area of the mounting frame 40 needs to be lengthened, a volume of the mounting frame 40 could be reduced. Therefore, the volume and weight of the mobile terminal 100 could be reduced, which could make it easy for user to carry.

An operation button 201 for controlling the driving device 50 may be arranged on the right side face 24 of the housing 20. The driving device 50 may be controlled to drive the mounting frame 40 to extend out of or retract into the receiving groove 27 by pressing the operation button 201. In the present embodiment, the number of the operation buttons 201 may be two, and both the two operation buttons 201 are connected to the mainboard 30, i.e., each of the operation buttons 201 may be electrically connected and signally connected to the mainboard 30. The driving device 50 may be controlled to drive the mounting frame 40 to extend out of the receiving groove 27 by pressing one of the operation button 201, and drive the mounting frame 40 to retract into the receiving groove 27 by pressing the other one of the operation button 201.

An accommodating space 212 for accommodating electronic components such as the mainboard 30 and battery may be defined in the middle of the housing 20. A connecting plate 214 may be arranged in the housing 20 and between the accommodating space 212 and the receiving groove 27. In this embodiment, the connecting plate 214 may be a bottom plate in the receiving groove 27. The connecting plate 214 may define a plurality of through holes 216 communicating with the accommodating space 212.

The mounting frame 40 may include a mounting box 41 and at least one connecting member 45 connected to the mounting box 41. The mounting box 41, which may be used for mounting other electronic devices such as a camera, an earpiece, a flash, fingerprint identification, etc., may include a front side face 413 facing the screen 60, a rear side face 414 facing the back panel 29, a left side face 415, a right side face 416 opposite to the left side face 415, and a top face 417. The first camera 410 may be arranged on the front side face 413. The front side face 413 of the mounting box 41 may be further provided with an earpiece 46 and a photosensitive element 47, both of which may be connected to the mainboard 30. The accommodating groove 411 defined at a bottom of the rear side face 414 of the mounting box 41 may extend along a left-right direction and penetrate the left side face 415 and the right side face 416 of the mounting box 41. The extension block 421 may be arranged on a lower portion of the rear side face 414 of the mounting box 41, and extend along the extending-retracting direction of the mounting frame 40. A rear side face of the extension block 421 and the rear side face 414 of the mounting box 41 may be on a same plane. A flash light 43 connected to the mainboard 30 may be arranged on the rear side face 414 of the mounting box 41 and be adjacent to the second camera 420. The first camera 410, the second camera 420, the flash light 43, the earpiece 46, and the photosensitive element 47 are misaligned to each other, i.e., these electronic components do not overlap in a front-rear direction in the mounting box 41, which could facilitate reducing a thickness of the mounting box 41, thereby making it possible to reduce an overall thickness of the mobile terminal 100. The first camera 410, the second camera 420, the flash light 43, the earpiece 46, and the photosensitive element 47 may be connected to the mainboard 30 by a data wire 49 passing through one of the through holes 216 of the housing 20, such that these electronic components could be electrically connected and signally connected to the mainboard 30. In the present embodiment, the earpiece 46 may be located on a top of the first camera 410, i.e., the earpiece 46 may be adjacent to the top face 417 of the mounting box 41. The mounting box 41 may be further provided with at least one connector 412 electrically and signally connected to the mainboard 30.

The number of the at least one connecting member 45 may be two. The two connecting members 45 may be arranged at a left end and a right end of a bottom face of the mounting box 41, respectively. Each of the connecting members 45 may include an extension strip 451 extending outwardly from the bottom face of the mounting box 41 and a protrusion 452 protruding at an end of the extension strip 451 and toward a direction substantially perpendicular to the extending direction of the extension strip 451. The driving device 50 may include two driving members 51 fixed in the housing 20 and connected to the mainboard 30, and a transmission members 53 arranged on each of the driving members 51. Each of the transmission members 53 may be a transmission rod extending along the extending-retracting direction of the mounting box 41 and passing through a corresponding through hole 216. An outer peripheral wall of each of the transmission rods may define a spiral slot 532 along the extending-retracting direction of the mounting box 41. Both the two driving members 51 may be electrically and signally connected to the mainboard 30. Each of the protrusions 452 may match with the spiral slot 532 of a corresponding transmission rod and configured to slide on the corresponding transmission rod. The two driving members 51 may drive the two transmission members 53 to rotate respectively to drive the protrusion 452 of each of the connecting members 45 to slide along a corresponding spiral slot 532, such that each of the connecting members 45 may extend out of or retreats into the corresponding through hole 216, so as to drive the mounting box 41 to extend out of or retract into the receiving groove 27.

Figure 4:
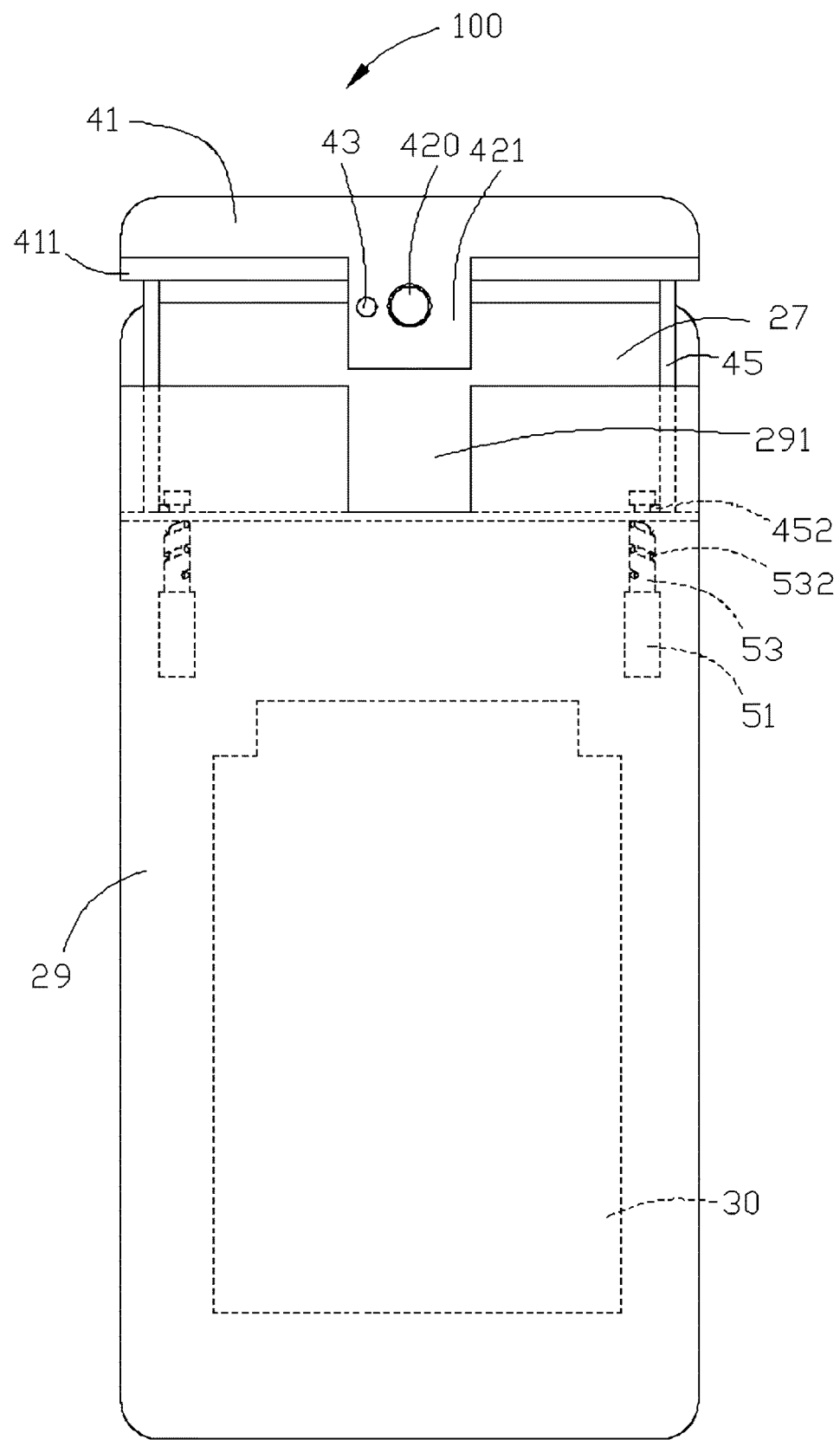
FIG. 4 is a schematic view of the mobile terminal showing a rear side face according to the first embodiment of the present disclosure.
Figure 5:
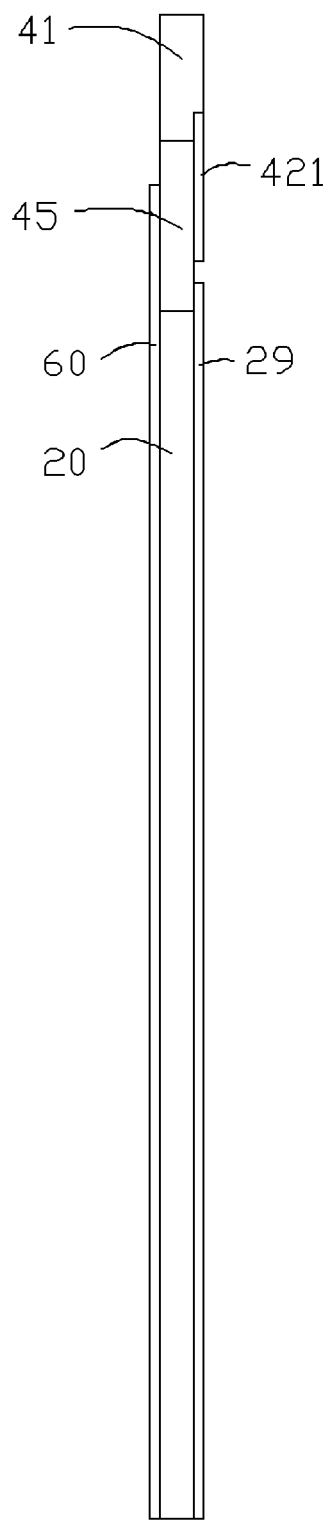
FIG. 5 is a schematic view of the mobile terminal showing a left side face according to the first embodiment of the present disclosure.

Referring to FIGS. 4-5 and combining with FIGS. 1-3, FIG. 4 is a schematic view of the mobile terminal showing a rear side face according to the first embodiment of the present disclosure, FIG. 5 is a schematic view of the mobile terminal showing a left side face according to the first embodiment of the present disclosure. When user needs the first camera 410 to photograph or needs the earpiece 46 to answer the call, one of the operation buttons 201 may be pressed, such that a triggering signal may be transmitted to a controller on the mainboard 30. After the controller receives the triggering signal, the controller may control the two driving members 51 to drive the two transmission members 53 to rotate, such that the protrusion 452 of each of the connecting members 45 may slide along the corresponding spiral slot 532 to drive each of the connecting members 45 to slide along the extending-retracting direction of the mounting box 41. Therefore, the mounting box 41 may extend out of the receiving groove 27. The extension block 421 may move out of the accommodating opening 291 until the first camera 410 and the earpiece 46 are exposed out of the housing 20, and then the two driving members 51 may stop driving the two transmission members 53 to rotate. At this time, the mounting box 41 may be positioned outside of the housing 20, which may facilitate for the user to use the electronic components, such as, the first camera 410 or the earpiece 46. Since the second camera 420 is directly exposed out of the housing 20, the second camera 420 could be used either the mounting box 41 extends out of or retracts into the receiving groove 27.

When the mounting box 41 needs to be received, the other operation button 201 may be pressed to transmit a triggering signal to a controller on the mainboard 30. After the controller receives the triggering signal, the controller may control the two driving members 51 to drive the two transmission members 53 to rotate in opposite directions, such that the protrusion 452 of each of the connecting members 45 may slide along the corresponding spiral slot 532 to drive the each connecting member 45 to slide into a corresponding through hole 216 in the extending-retracting direction of the mounting box 41. Therefore, the mounting box 41 may be drive to retract into the receiving groove 27. The extension block 421 may slide into the accommodating opening 291 until both the first camera 410 and the earpiece 46 are hidden into the receiving groove 27, and then the two driving members 51 may stop driving the two transmission members 53 to rotate. At this time, the mounting box 41 may be positioned in the receiving groove 27 of the housing 20. The left side face 415 of the mounting box 41 may be flush with the left side face 23 of the housing 20, the right side face 416 of the mounting box 41 may be flush with the right side face 24 of the housing 20, and the top face 417 of the mounting box 41 may be flush with the top face of the screen 60.

The the receiving groove 27 may be defined by the top face 26 of the housing 20, the screen 60 and the back panel 29. The mounting box 41 may be received in the receiving groove 27 and configured to slide out of or into the receiving groove 27. The controller on the mainboard 30 could control the driving device 50 to drive the mounting box 41 to extend out of or retract into the receiving groove 27, such that the electronic components, such as the first camera 410, the earpiece 46 and the photosensitive element 47 on the mounting box 41 could be exposed out of or hidden into the housing 20. Since the electronic components all are arranged on the mounting box 41, they do not occupy any areas of the screen 60 and the back panel of the mobile terminal 100, the screen ratio of the mobile terminal 100 could be increased. Moreover, the second camera 420 may be always exposed out of the housing 20, which could facilitate the user in using the second camera 420.

In other embodiments, the operation button can be a touch icon provided on the screen 60. The touch icon can be clicked to send a triggering signal to a controller on the motherboard 30. The controller receives the triggering signal and controls the two driving members 51 to drive the two transmission members 53 to rotate.

In other embodiments, the operation button can be a telephone answering key arranged on the screen 60. When the telephone answering key is touched to answer the telephone, the telephone answering key may send a triggering signal to the controller of the mainboard. After the controller receives the triggering signal, the controller may control the two driving members 51 to drive the two transmission members 53 to rotate, such that the mounting box 41 is driven to extend out of the housing 20. When the telephone answering key is touched to hang up the phone, the telephone answering key will send a triggering signal to the controller of the mainboard 50, and the controller will control the driving members 51 to drive the corresponding transmission members 53 to rotate in a opposite direction, such that the mounting box 41 is driven to retrace into the housing 20.

In other embodiments, a gap 460 communicating with the earpiece 46 may be defined at the top face 417 of the mounting box 41 and be adjacent to the earpiece 46. When the mobile terminal 100 has the call answered, the mounting box 41 does not need to extend out of the receiving groove 27, and sounds of the earpiece 46 may be transmitted from the gap 460.

Figure 6:
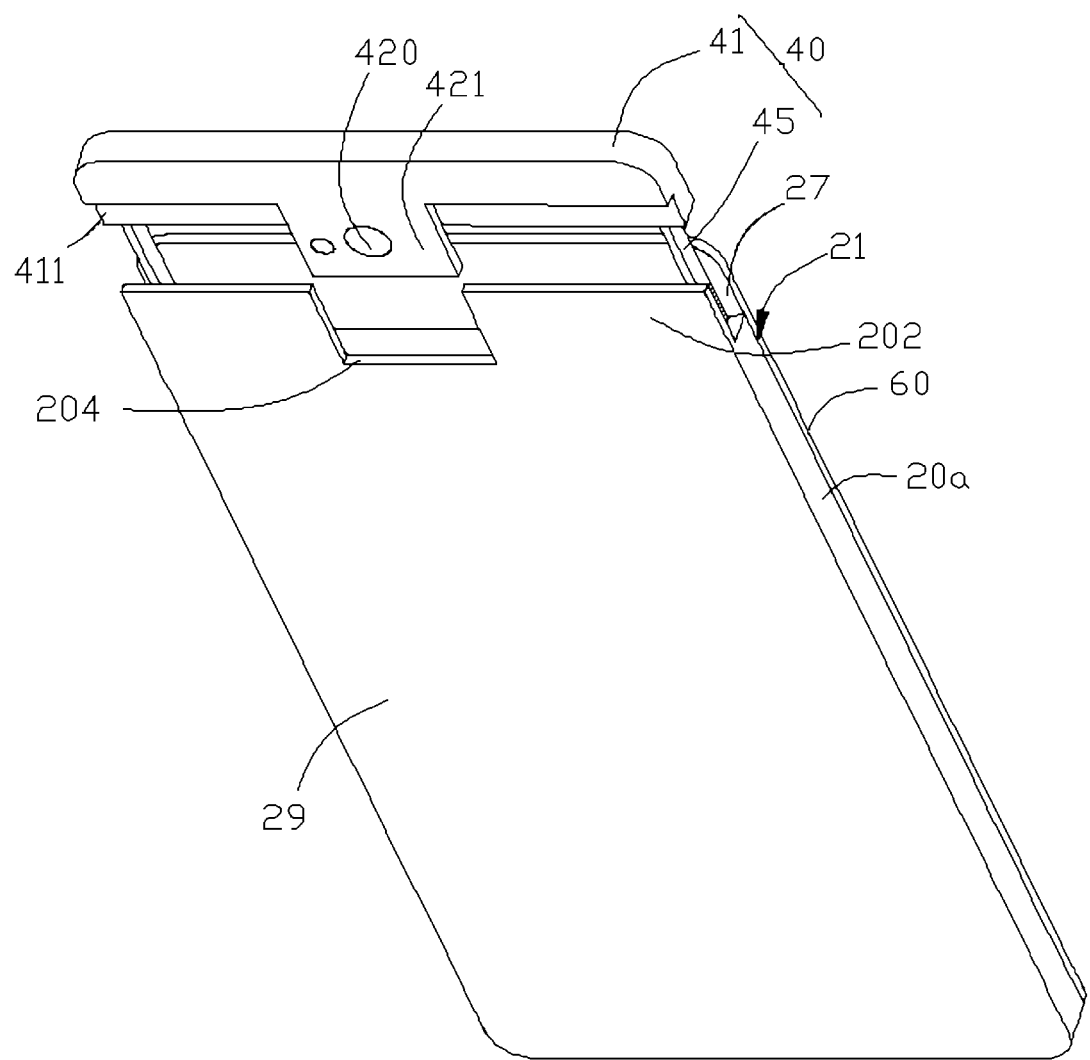
FIG. 6 is a perspective view of the mobile terminal according to a second embodiment of the present disclosure.

Referring to FIG. 6, a perspective view of the mobile terminal according to a second embodiment of the present disclosure is depicted. The structure of the second embodiment of the mobile terminal may be similar to that of the first embodiment, and the difference therebetween may be: in the second embodiment, a housing 20a and a back panel may be formed of a single piece. A top face of the housing 20a may define a receiving groove 27 extending along a left-right direction. The receiving groove 27 may extend to a left side face and a right side face of the housing 20a and penetrate the left side face and the right side face of the housing 20a opposite to the left side face of the housing 20a. A flange 202 may be arranged on the top face of the housing 20a and be adjacent to the rear side face. The flange 202 may extend along a left-right direction. The receiving groove 27 may be defined by top face of the housing 20a, the flange 202 and the screen 60. An accommodating groove 411 for accommodating the flange 202 may be defined at the bottom of the side face of the mounting frame 40 facing away from the screen 60. When the mounting frame 40 retracts into the receiving groove 27, the flange 202 may be accommodated in the accommodating groove 411, and the second camera 420 may be exposed out of the flange 202. An accommodating opening 204 may be defined at a top of the flange 202 along the extending-retracting direction of the mounting frame 40. The accommodating opening 204 may be in communication with the receiving groove 27, and the second camera 420 may be accommodated in the accommodating opening 204 when the mounting frame 40 retracts into the receiving groove 27, such that the second camera 420 could be exposed out of the housing 20a. In this embodiment, the accommodating opening 204 may be defined at a middle position of the flange 202.

An extension block 421 may be arranged on a side face of the mounting frame 40 facing away from the screen 60. When the mounting frame retracts into the receiving groove, the extension block 421 may be accommodated in the accommodating opening 204. The second camera 420 may be arranged on the extension block 421. When the mounting frame 40 retracts into the receiving groove 27, the extension block 421 may be accommodated in the accommodating opening 204, such that the second camera 420 could be exposed out of the housing 20. Since the extension block 421 is arranged on the mounting frame 40, and the second camera 420 is mounted on the extension block 421, only a partial area on the mounting frame 40 needs to extend, a volume of the mounting frame 40 could be reduced. Therefore, the volume and weight of the mobile terminal 100 could be reduced.

Figure 7:
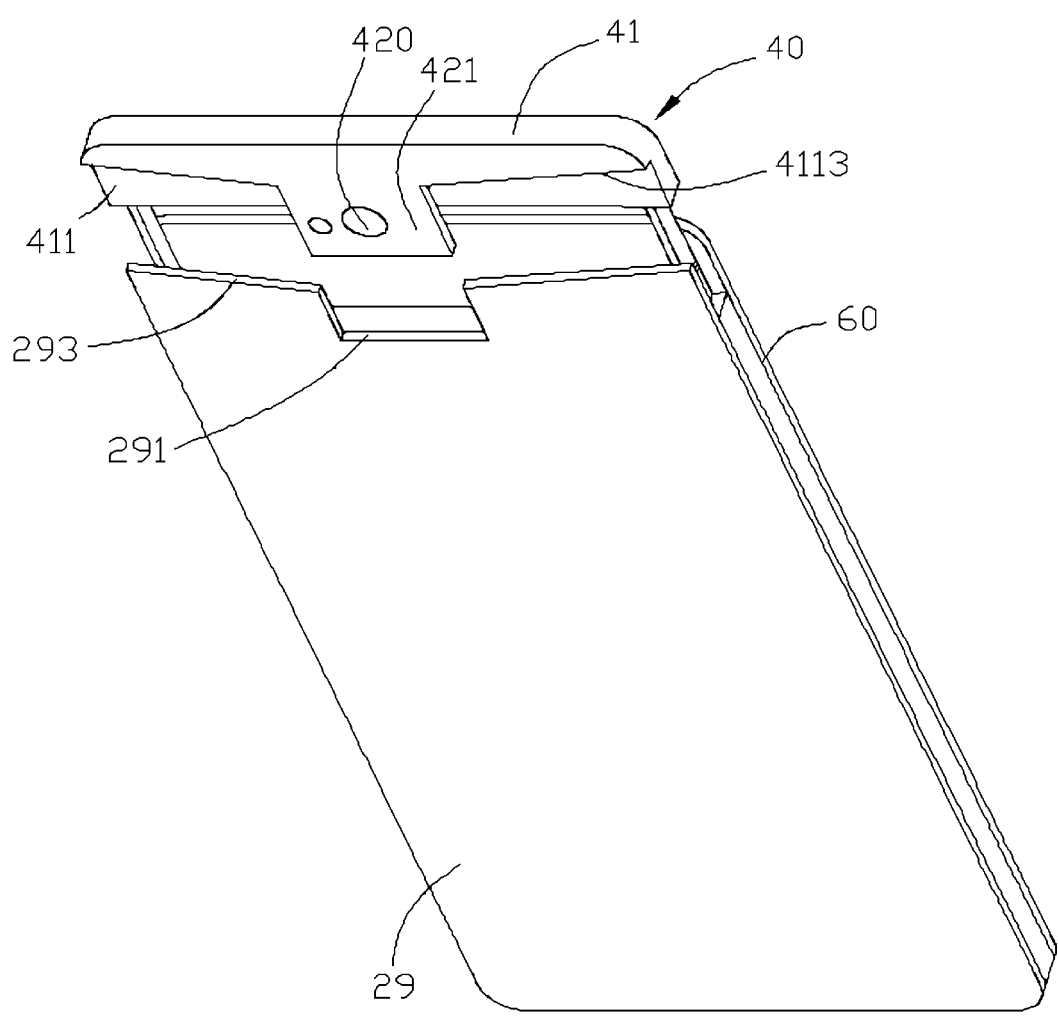
FIG. 7 is a perspective view of the mobile terminal according to a third embodiment of the present disclosure.
Figure 8:
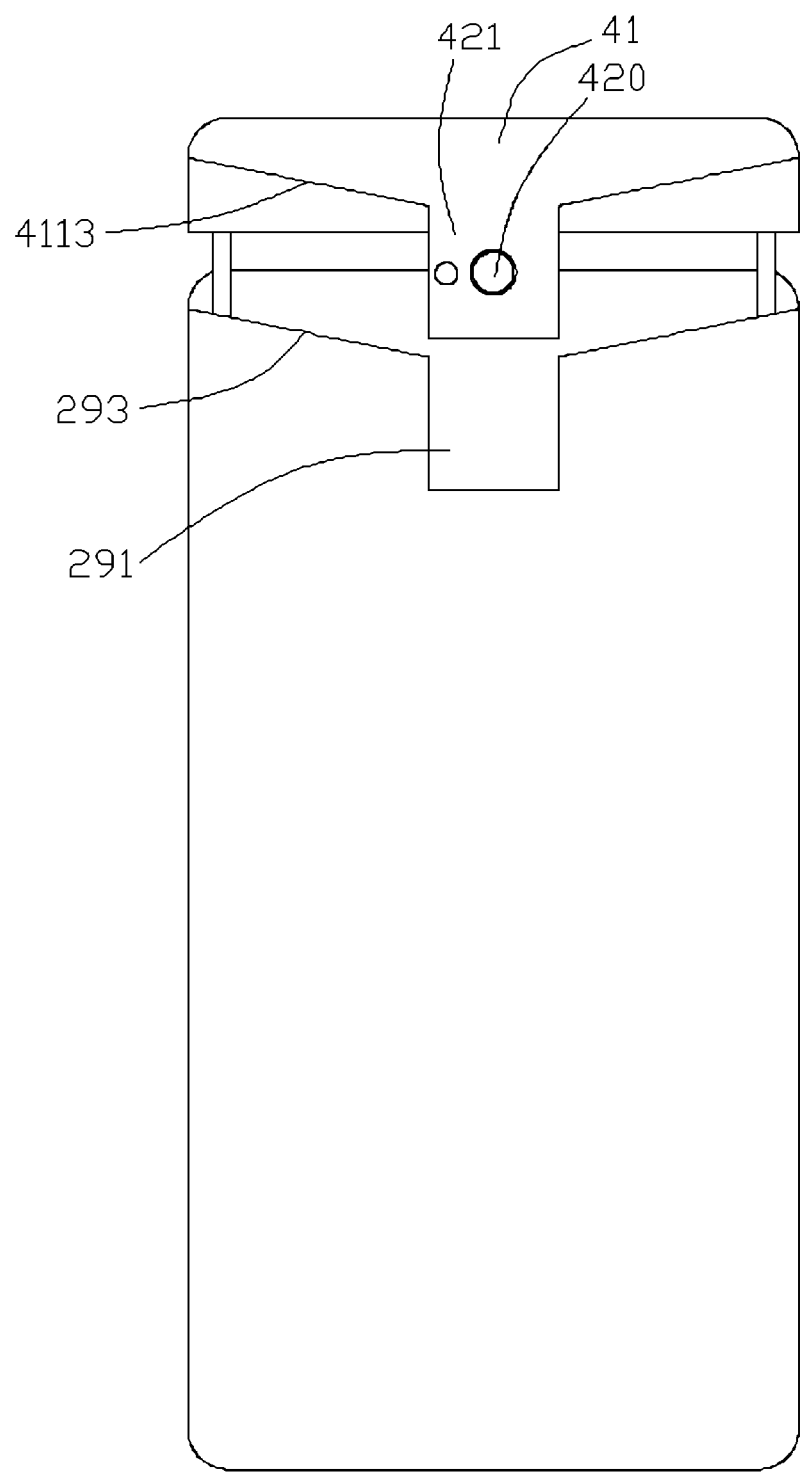
FIG. 8 is a schematic view of the mobile terminal showing a rear side face according to the third embodiment of the present disclosure.

Referring to FIGS. 7 and 8, a perspective view of the mobile terminal according to a third embodiment of the present disclosure and a schematic view of the mobile terminal showing a rear side face according to the third embodiment of the present disclosure are depicted. The structure of the third embodiment of the mobile terminal may be similar to that of the first embodiment, and the difference therebetween may be: in the third embodiment, the back panel 29 may include two top faces 293, one of the two faces 293 may be on the left side of the accommodating opening 204, the other one of the two faces 293 may be on the right side of the accommodating opening 204, both the two the two faces 293 are inclined faces. The mounting frame 40 may include two mating faces 4113 in the accommodating groove 411, one of the two mating faces 4113 may be on the left side of the extension block 421, the other one of the mating faces 4113 is on the right side of the extension block 421. Each of the two mating faces 4113 could match with a corresponding inclined face 293. The two inclined faces 293 respectively extend obliquely downward from the left and right side faces of the housing 20 to communicate with the accommodating opening 291. The two mating faces 4113 respectively extend obliquely downward from the left and right side faces of the mounting box 41 to communicate with the extension block 421.

In other embodiments, on the basis of the second embodiment of the mobile terminal of the present disclosure, the flange 202 of the housing 20a may include two top faces 293, one of the two faces 293 may be on the left side of the accommodating opening 204, the other one of the two faces 293 may be on the right side of the accommodating opening 204, both the two the two faces 293 are inclined faces. The mounting frame 40 may include two mating faces 4113 in the accommodating groove 411, one of the two mating faces 4113 may be on the left side of the extension block 421, the other one of the mating faces 4113 is on the right side of the extension block 421. Each of the two mating faces 4113 could match with a corresponding inclined face 293.

Figure 9:
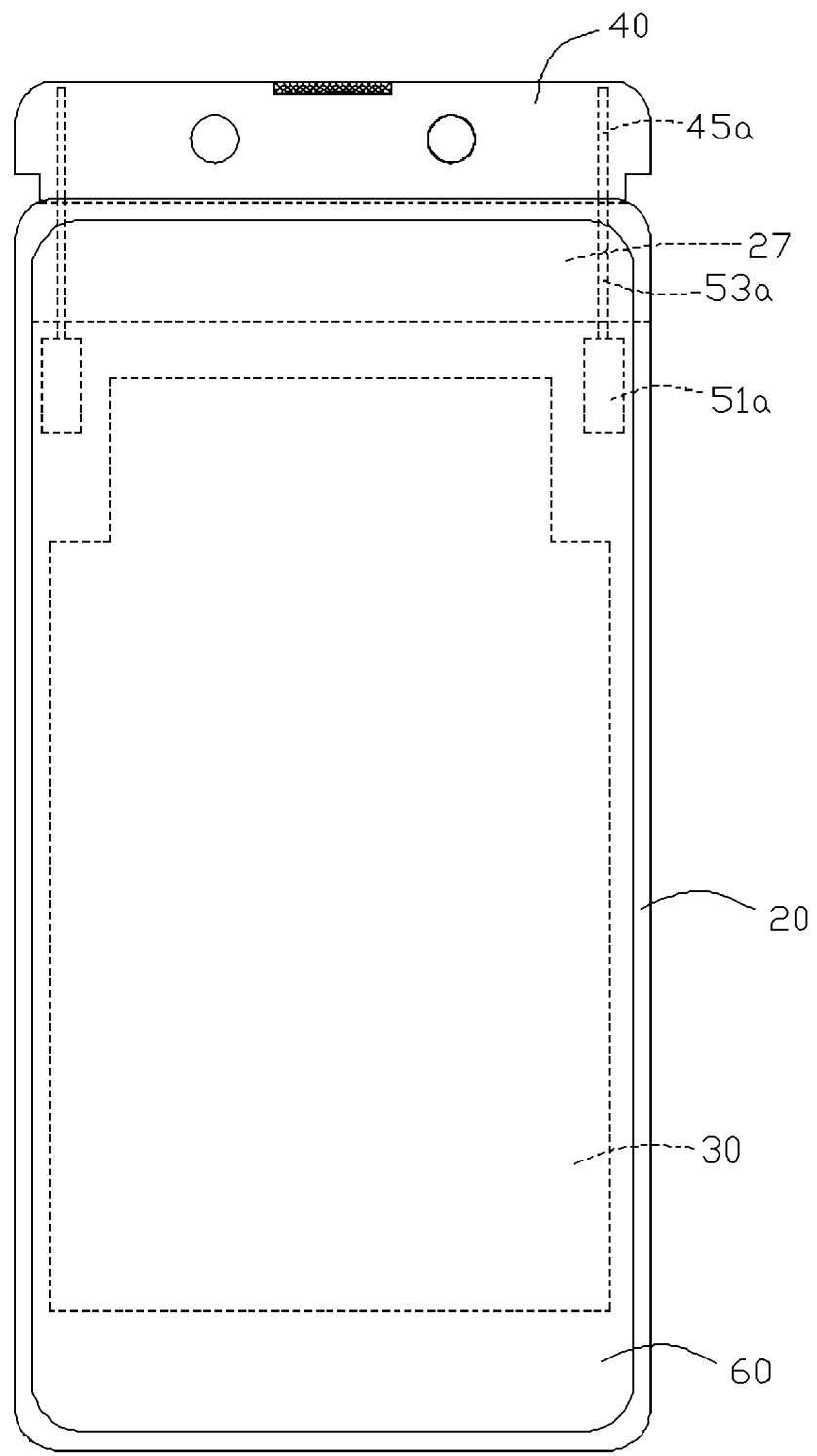
FIG. 9 is a schematic view of the mobile terminal according to a fourth embodiment of the present disclosure.

Referring to FIG. 9, a schematic view of the mobile terminal according to a fourth embodiment of the present disclosure is depicted. The structure of the fourth embodiment of the mobile terminal may be similar to that of the first embodiment, and the difference therebetween may be: the driving device of the mobile terminal of the fourth embodiment, which may be different from the driving device of the mobile terminal of the first embodiment, may include two motors 51a fixed in the housing 20 and connected to the mainboard 30, and each of the motors 51a may be connected to a screw bar 53a. Each of the motors 51a may be electrically and signally connected to the mainboard 30. Each of the screws 53a may extend along the extending-retracting direction of the mounting frame 40. The mounting frame 40 may define two screw holes 45a respectively, such that the screw bar 53a may be screwed to the mounting frame 40. The mainboard 30 may control the two motors 51a to drive the two screws bar 53a to rotate, thereby driving the mounting frame 40 to extend out of or retract into the receiving groove.

Figure 10:
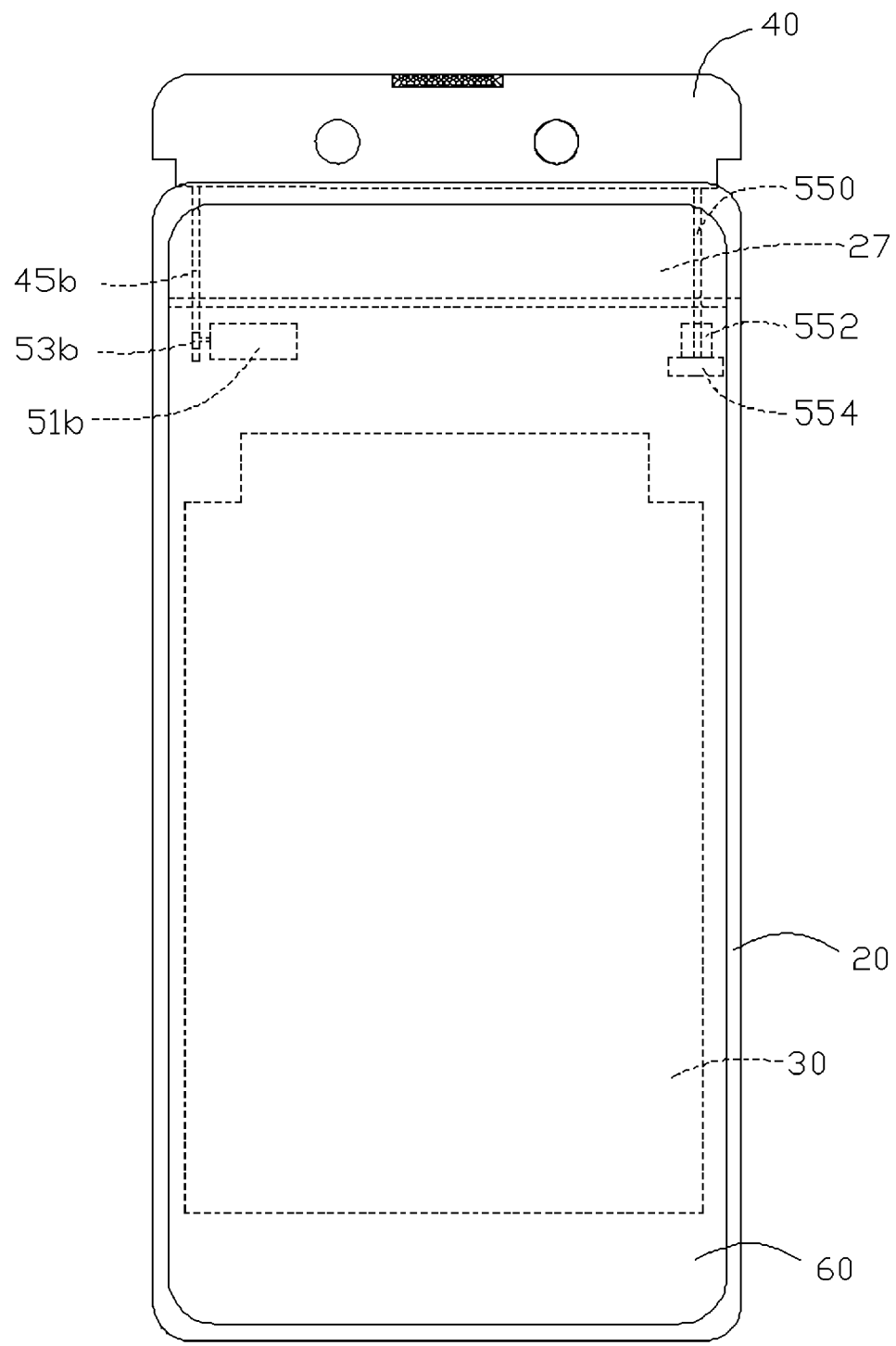
FIG. 10 is a schematic view of the mobile terminal according to a fifth embodiment of the present disclosure.

Referring to FIG. 10, a schematic view of the mobile terminal according to a fifth embodiment of the present disclosure is depicted. The structure of the fifth embodiment of the mobile terminal may be similar to that of the first embodiment, and the difference therebetween may be: the driving device of the mobile terminal of the fifth embodiment, which may be different from the driving device of the mobile terminal of the first embodiment, may include a motor 51b fixed in the housing 20 and connected to the mainboard 30, a driving gear 53b connected to the motor 51b, and a rack 45b connected to the mounting frame 40 and extending along the extending-retracting direction of the mounting frame 40. The motor 51b may be electrically and signally connected to the mainboard 30. The driving gear 53b may engage with the rack 45b. The motor 51b may drive the driving gear 53b to rotate to drive the rack 45b to slide, such that the mounting frame 40 could extend out of or retracts into the receiving groove 27.

In the fifth embodiment, a guide mechanism may be further provided between the housing 20 and the mounting frame 40. The guide mechanism may include: a guiding post 550 extending along the extending-retracting direction of the mounting frame 40, a limiting block 552 arranged in the housing 20 and corresponding to the guiding post 550, and a stop block 554 arranged on an end of the guiding post 550 away from the mounting frame 40. The limiting block 552 may define a guiding hole along the extending-retracting direction of the mounting frame 40. The guiding post 550 may be inserted into the guide hole and configured to slide in the guide hole. In the process that the mounting frame 40 extends out of or retracts into the receiving groove 27, the guiding post 550 may slide along the guiding hole of the limiting block 552, and the stop block 554 may be stopped moving by an end of the limiting block 552 away from the mounting frame 40, thereby preventing the mounting frame 40 from being detached from the housing 20.

Figure 11:
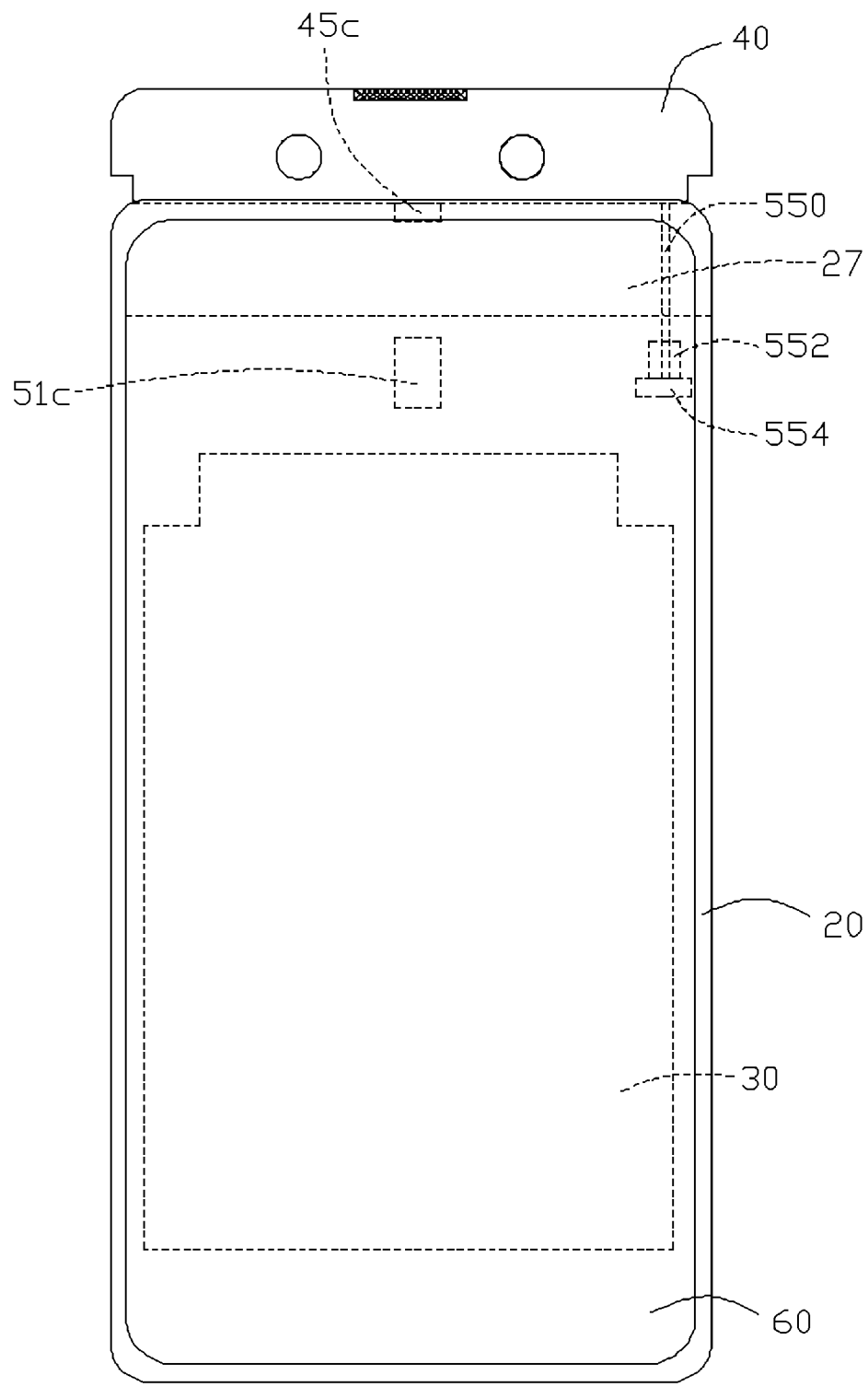
FIG. 11 is a schematic view of the mobile terminal according to a sixth embodiment of the present disclosure.

Referring to FIG. 11, a schematic view of the mobile terminal according to a sixth embodiment of the present disclosure is depicted. The structure of the sixth embodiment of the mobile terminal may be similar to that of the fifth embodiment, and the difference therebetween may be: the driving device in the sixth embodiment may include an electromagnet 51c fixed in the housing 20 and connected to the mainboard 30, and a magnet 45c arranged on the mounting frame 40 and corresponding to the electromagnet 51c. The electromagnet 51c may be electrically and signally connected to the mainboard 30. When the mounting frame 40 is required to extend out of the receiving groove 27, the mainboard 30 may supply power to the electromagnet 51c, such that magnetic poles between the electromagnet 51c and the magnet 45c, i.e., a magnetic pole of the electromagnet 51c adjacent to the magnet 45c and a magnetic pole of the magnet 45c adjacent to the electromagnet 51c, are same, and that the electromagnet 51c and the magnet 45c may be mutually repelled. Therefore, the mounting frame 40 may be driven to extend out of the receiving groove 27. When the mounting frame 40 is required to retract into the receiving groove 27, the mainboard 30 may supply power to the electromagnet 51c and changes the power supply direction, such that the magnetic poles between the electromagnet 51c and the magnet 45c become different, and that the electromagnet 51ic and the magnet 45c attract each other. Therefore, the mounting frame 40 may be driven to retract into the receiving groove 27. In the process that the mounting frame 40 extends out of or retracts into the receiving groove 27, the guiding post 550 may slide along the guide hole of the limiting block 552, and the stop block 554 may be arranged on an end of the limiting block 552 away from the mounting frame 40 to prevent the mounting frame 40 from being detached from the housing 20.

In other embodiments, the magnet 45c according to the sixth embodiment may also be replaced by an electromagnet electrically connected to the mainboard 30. The mainboard 30 may supply electric power to the two electromagnets and can change the power supply direction, so as to adjust the magnetic poles of the two electromagnets adjacent to each other to be same or different, thereby driving the mounting frame 40 to extend out of or retract into the receiving groove 27.

Figure 12:
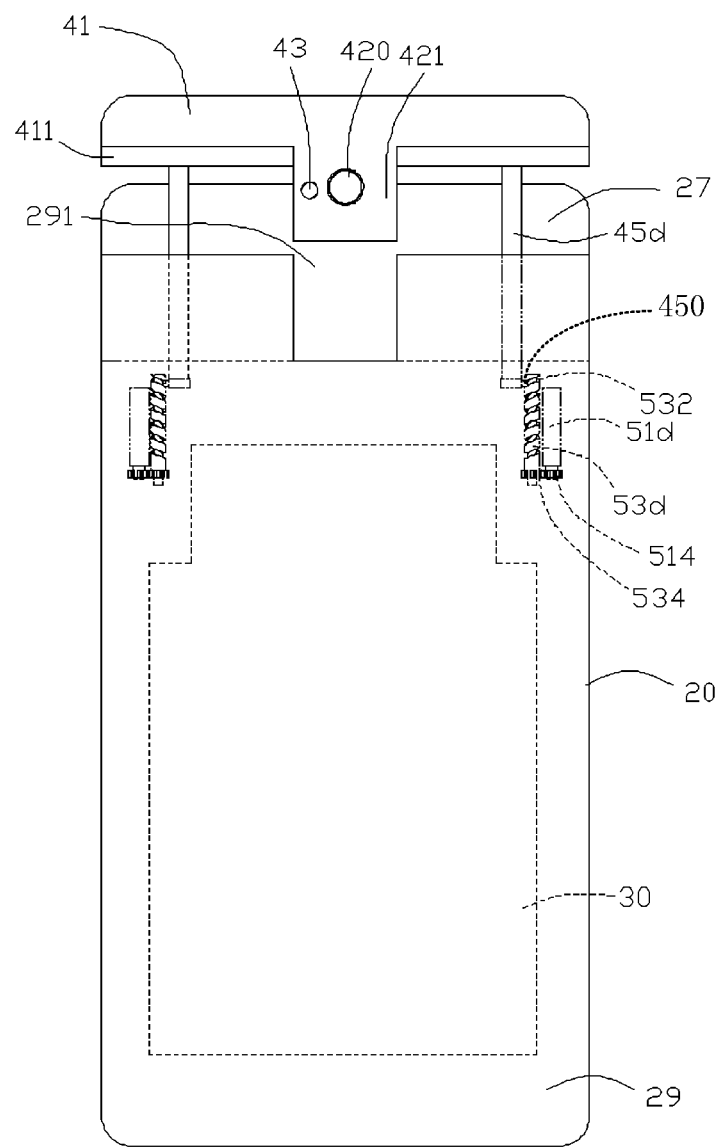
FIG. 12 is a schematic view of the mobile terminal according to a seventh embodiment of the present disclosure.

Referring to FIG. 12, a schematic view of the mobile terminal according to a seventh embodiment of the present disclosure is depicted. The structure of the seventh embodiment of the mobile terminal may be similar to that of the first embodiment, and the difference therebetween may be: the driving device of the mobile terminal according to the seventh embodiment, which may be different from the driving device of the mobile terminal according to the first embodiment, may include two motors 51d fixed in the housing 20 and connected to the mainboard 30, teo driving gears 514 connected to a corresponding motor 51d, and two transmission rods 53d adjacent to a corresponding motor 51d and extending along the extending-retracting direction of the mounting box 41, and a connecting rod 45d adjacent to each of the transmission rods 53d and sliding along the extending-retracting direction of the mounting box 41. An end of each of the transmission rods 53d may be provided with a driven gear 534 engaging with the driving gear 514 on a corresponding motor 51d. An outer peripheral wall of each of the transmission rods 53d may define a spiral slot 532 in the extending-retracting direction of the mounting box 41. A top of each of the connecting rods 45d may be connected to the mounting box 41, and a bottom of each of the connecting rods 45d may be provided with a sliding block 450. The sliding block 450 may be accommodated in the spiral slot 532 of a corresponding transmission rod 53d and configured to slide along the spiral slot 532. The two motors 51d may be electrically and signally connected to the mainboard 30. The mainboard 30 controls the two motors 51d to drive the two driving gears 514 to rotate so as to drive the corresponding driven gears 534 to rotate, such that each of the transmission rods 53d rotates to drive the sliding block 450 of the corresponding connecting rod 45d to slide along the corresponding spiral slot 532, thereby driving the mounting frame 40 to extend out of or retract into the receiving groove 27, and driving the extension block 421 to extend out of or retract into the accommodating opening 291.

Figure 13:
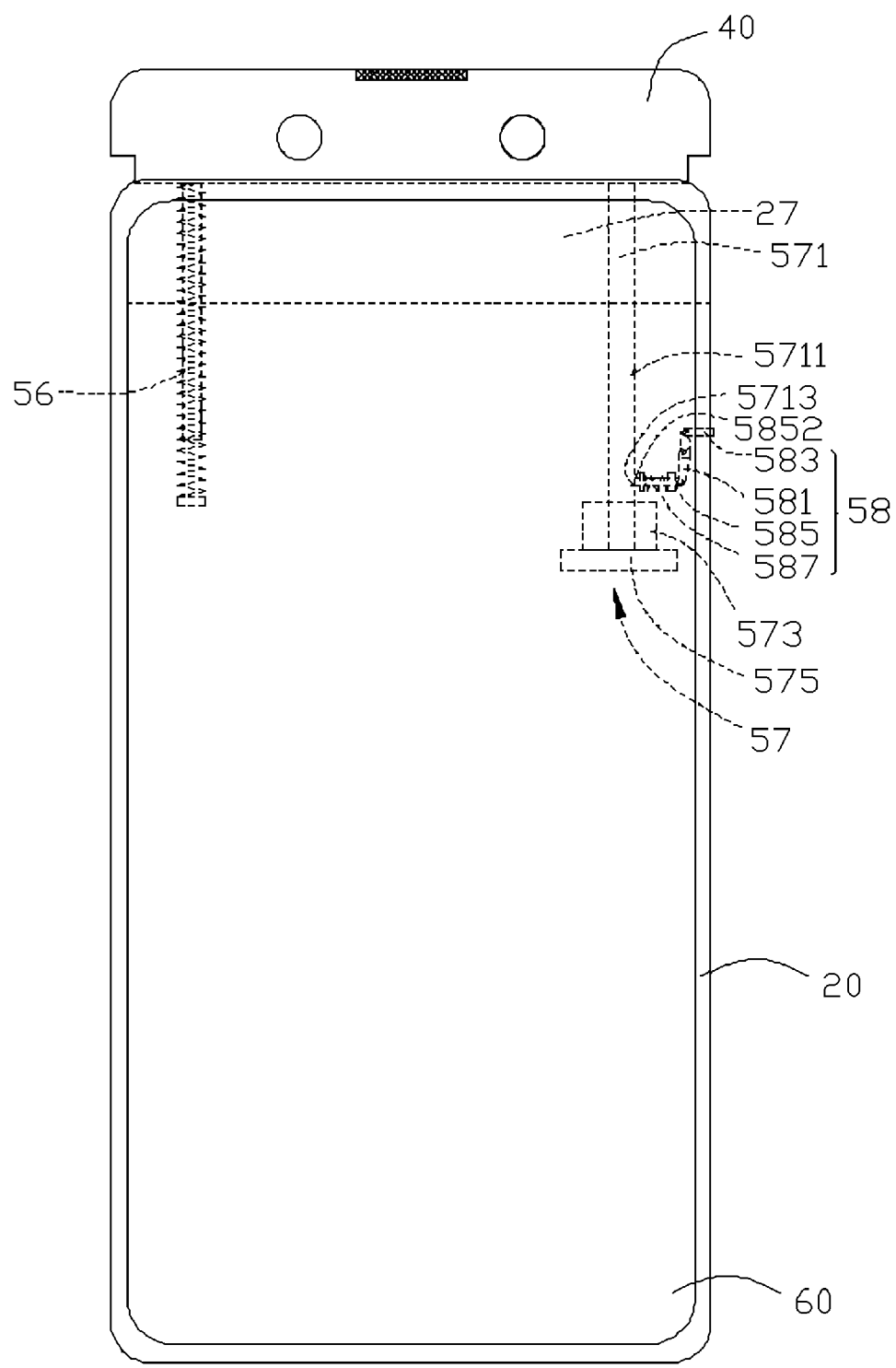
FIG. 13 is a schematic view of the mobile terminal according to an eighth embodiment of the present disclosure.

Referring to FIG. 13, a schematic view of the mobile terminal according to an eighth embodiment of the present disclosure is depicted. The structure of the eighth embodiment of the mobile terminal may be similar to that of the first embodiment, and the difference therebetween may be: the driving device of the mobile terminal of the eighth embodiment, which may be different from the driving device of the mobile terminal of the first embodiment, may include an elastic member 56 arranged between and elastically coupled between the housing 20 and the mounting frame 40, and a guiding mechanism 57 arranged between the mounting frame 40 and the housing 20, and a limiting mechanism 58 arranged on the housing 20. The elastic member 56 may be used to push the mounting frame 40 to extend out of the receiving groove 27. In an embodiment, the elastic member 56 may be a spring connected to the mounting frame 40 and the housing 20. The guiding mechanism 57 may include a guiding bar 571 connected to the mounting frame 40 along the extending-retracting direction of the mounting frame 40, a limiting block 573 arranged in the housing 20 and corresponding to the guiding bar 571, and a stop block 575 arranged on an end of the guiding bar 571 away from the mounting frame 40. The limiting block 573 may define a guiding hole along the extending-retracting direction of the mounting frame 40. The guiding bar 571 may be inserted into the guiding hole and configured to slide in the guiding hole. The stop block 575 may be arranged at an end of the limiting block 573 away from the mounting frame 40 to prevent the mounting frame 40 from being detached from the housing 20. A peripheral wall of the guiding bar 571 may define a first limiting slot 5711 adjacent to the mounting frame 40 and a second limiting slot 5713 away from the mounting frame 40. The limiting mechanism 58 may include a rotating member 581 rotatably connected to the housing 20, a pressing member 583 rotatably connected to an end of the rotating member 581, a limiting sliding block 585 rotatably connected to the other end of the rotating member 581 away from the pressing member 583 and configured to limit the guiding bar, and an elastic member 587 connected to force the limiting sliding block 585 to resume an original position. An end of the limiting sliding block 585 away from the rotating member 581 may be inserted into the first limiting slot 5711 or the second limiting slot 5713, and configured to slide into or out of the first limiting slot 5711 or the second limiting slot 5713. An end of the limiting sliding block 585 adjacent to the guiding bar 571 may be provided with a guiding face 5852. An end of the pressing member 583 away from the rotating member 581 may extend out of the housing 20 to form an operation button. The operation button of the pressing member 583 may be pressed to drive the rotating member 581 to rotate, such that the rotating member 581 drives the limiting sliding block 585 to slide out of the first limiting slot 5711 or the second limiting slot 5713, and the elastic member 587 may be elastically deformed.

When the mounting frame 40 is received within the receiving groove 27, the elastic member 56 may be extruded between the mounting frame 40 and the housing 20, thus the elastic member 56 is elastically deformed. An end of the limiting sliding block 585 away from the rotating member 581 may be snapped into the first limiting slot 5711 to prevent the elastic member 56 from pushing the mounting frame 40 to extend out of the limiting slot 5711.

When the mounting frame 40 is required to extend out of the receiving groove 27, the operation button of the pressing member 583 may be pressed to push the rotating member 581 to rotate, and the rotating member 581 may drive the limiting sliding block 585 to slide along a direction away from the guiding bar 571 to disengage from the first limiting slot 5711, and the elastic member 587 may be elastically deformed. The elastic member 56 restores deformation to push the mounting frame 40 to extend out of the receiving groove 27. The guiding bar 571 slides along the guide hole of the limiting block 573 until the mounting frame 40 extends out of the receiving groove 27. At this time, the stop block 575 may be stopped from moving by the limiting block 573, so as to prevent the mounting frame 40 from being detached from the housing 20. When the limiting sliding block 585 is directly facing the second limiting slot 5713, the elastic member 587 restores elastic deformation to push the limiting sliding block 585 to be snapped into the second limiting slot 5713 to fix the position of the mounting frame 40.

When the mounting frame 40 is required to retract into the receiving groove 27, the mounting frame 40 may be pressed toward the receiving groove 27, such that the mounting frame 40 slides into the receiving groove 27. An upper face of the second limiting slot 5713 of the guiding bar 571 may be slidably pressed against the guide face 5852 of limiting sliding block 585, such that the guiding bar 571 slides along a direction away from the top block 575 to disengage from the limitation of the limiting sliding block 585. Both the elastic member 56 and the elastic member 587 are elastically deformed. When the guiding bar 571 slides to that the first limiting slot 5711 directly faces the limiting sliding block 585, the elastic member 587 may restore deformation to push the limiting sliding block 585 to be snapped into the first limiting slot 5711 so as to fix the position of the mounting frame 40 to be received within the receiving groove 27.

The mounting frame 40 of the eighth embodiment of the present disclosure may be controlled to extend out of or retract into the receiving groove 27 manually via the elastic member 56 between and abutting the housing 20 and the mounting frame 40, the guide mechanism 57 arranged between the mounting frame 40 and the housing 20, and the limiting mechanism 58 arranged on the housing 20. Accordingly, the first camera 410 not only does not occupy the area of the screen 60 of the mobile terminal 100 so as to increase the screen ratio of the mobile terminal 100, but also can save energy and improve the user's operation feeling.

In some embodiments, as shown in FIGS. 2 to 3, the mobile terminal may include a back shell 29, a front shell 20, a mainboard 30, a screen 60, a slidable device 40, and a driving mechanism 50. The back shell 29 may define an accommodating opening 291 on a top of the back shell 29. The front shell 20 may include a pair of spaced and parallel walls 22, 23 engaged with the back shell 29 to define a chamber 212. The front shell 20 may have a top 214 connected with the walls and lower than a top of the back shell 29. The mainboard 30 may be received in the chamber 212. The screen 60 may be embedded in the front shell 20 and having a display area. The top 214 of the front shell 20 may be lower than the top of the screen 60, such that a storage space 27 may be defined by a top 214 of the front shell 20, the screen 60 and the back shell 29, the chamber 212 and the storage space 27 may be divided by the top 214 of the housing 20. The slidable device 40 may be received in the storage space 27 and configured to move between a first position at which the slidable device 40 extends out of the storage space 27 and a second position at which the slidable device 40 retracts into the storage space 27. A first camera 410 may be arranged on a face of the slidable device 40 facing the screen 60 and connected with the mainboard 30, when the slidable device 40 is at the first position, the first camera 410 may be exposed out of the storage space 27; when the slidable device 40 is at the second position, the slidable device 40 may be covered by the display area and the first camera 410 may be received in the storage space 27. A second camera 420 may be arranged on a face of the slidable device 40 facing the back shell 29 and connected to the mainboard 30, when the slidable device 40 is at the first position, the second camera 420 may be exposed out of the storage space 27, when the slidable device 40 is at the second position, the second camera 420 may be accommodated in the accommodating opening 291 and exposed out of the back shell 29 through the accommodating opening 291. The driving mechanism 50 may be connected to the mainboard 30, received in the chamber 212 and configured to drive the slidable device 40 with the first and second cameras 410, 420 to move between the first position and the second position.

In other embodiments, an electronic apparatus is provided. As shown in FIGS. 2 to 3, the electronic apparatus may include a housing 20 including a pair of spaced and parallel walls 23, 24 and a top 214 connected with the walls 23,24; a screen 60 engaged with the walls 23, 24 to define a chamber 212, the screen 60 may have a top extending beyond the top 214 of the housing 20 such that a storage space 27 may be defined by the top 214 of the housing 20 and the screen 60; a mainboard 30 received in the chamber 212; a slidable device 40 received in the storage space 27 and configured to move between a first position at which the slidable device 40 extends out of the storage space 27 and a second position at which the slidable device 40 retracts into the storage space 27, a first camera 410 may be arranged on the slidable device 40 and connected to the mainboard 30, when the slidable device 40 is at the first position, the first camera 410 may be exposed out of the storage space 27; when the slidable device 40 is at the second position, the slidable device 40 may be covered by the display area and the first camera 410 may be received in the storage space 27, a second camera 420 may be arranged on a face of the slidable device 40 facing away from the screen 60 and connected to the mainboard 30, the second camera 420 may be exposed out of the housing 20 regardless of whether the slidable device 40 is at the first position or the second position.

The foregoing are embodiments of the present disclosure. It should be noted that a person of ordinary skilled in the art can further make some improvement and modification without departing from the principles of the embodiments of the present disclosure. The improvement and modification may also be regarded as falling into the protection scope of the present disclosure.

What is claimed is:

1. A mobile terminal, comprising:
   a housing, comprising a front side face, a rear side face, a left side face, a right side face opposite to the left side face, and a top face, wherein a receiving groove is defined on the top face of the housing along a left-right direction and is located between the front side face and the rear side face, the receiving groove extends to the left side face and the right side face and penetrate the left side face and the right side face;
   a mainboard, arranged in the housing,
   a screen, arranged on the front side face of the housing and connected to the mainboard; and;
   a mounting frame, wherein a side face of the mounting frame facing the screen is provided with a first camera connected to the mainboard, a side face of the mounting frame facing away from the screen is provided with a second camera always exposed out of the housing, the mounting frame is configured to extend out of or retract into the receiving groove, such that the first camera is exposed out of or hidden into the housing.

2. The mobile terminal according to claim 1, wherein a flange is arranged on the top face of the housing and adjacent to the rear side face, the flange extends along a left-right direction, the top face of the housing, the flange and the screen define the receiving groove;

the mounting frame defines a accommodating groove at a bottom of the side face facing away from the screen, when the mounting frame retracts into the receiving groove, the flange is accommodated in the accommodating groove, the second camera is exposed out of the flange.

3. The mobile terminal according to claim 2, wherein an accommodating opening is defined on a top of the flange along an extending-retracting direction of the mounting frame, when the mounting frame retracts into the receiving groove, the second camera is accommodated in the accommodating opening.

4. The mobile terminal according to claim 3, wherein an extension block is arranged on the side face of the mounting frame facing away from the screen, the second camera is arranged on the extension block, when the mounting frame retracts into the receiving groove, the extension block is accommodated in the accommodating opening.

5. The mobile terminal according to claim 4, wherein the flange comprises two top faces, one of the two faces is on the left side of the accommodating opening, the other one of the two faces is on the right side of the accommodating opening, both the two top faces are inclined faces;
the mounting frame comprises two mating faces in the accommodating groove, one of the two mating faces is on the left side of the extension block, the other one of the mating face is on the right side of the extension block, each of the two mating faces matches with a corresponding inclined face.

6. The mobile terminal according to claim 1, wherein a back panel is arranged on the rear side face of the housing, an orthogonal projection of a top face of the back panel on a rear side face of the screen is lower than a top face of the screen, the top face of the housing, the back panel and the screen define the receiving groove;
the mounting frame defines an accommodating groove at the bottom of the side face facing away from the screen, when the mounting frame retracts into the receiving groove, a top of the back panel is accommodated in the accommodating groove, the second camera is exposed out of the back panel.

7. The mobile terminal according to claim 6, wherein an accommodating opening is defined on the top of the back panel along an extending-retracting direction of the mounting frame, when the mounting frame retracts into the receiving groove, and the second camera is accommodated in the accommodating opening.

8. The mobile terminal according to claim 7, wherein an extension block is arranged on the side face of the mounting frame facing away from the screen, the second camera is arranged on the extension block, when the mounting frame retracts into the receiving groove, the extension block is capable of being accommodated in the accommodating opening.

9. The mobile terminal according to claim 8, wherein the back panel comprises two top faces, one of the two faces is on the left side of the accommodating opening, the other one of the two faces is on the right side of the accommodating opening, both the two top faces are inclined faces;
the mounting frame comprises two mating faces in the accommodating groove, one of the two mating faces is on the left side of the extension block, the other one of the mating faces is on the right side of the extension block, each of the two mating faces matches with a corresponding inclined face.

10. The mobile terminal according to claim 1, wherein the mounting frame comprises a mounting box, the first camera and the second camera are arranged on the mounting box; when the mounting box retracts into the receiving groove, a left side face of the mounting box is flush with the left side face of the housing, a right side face of the mounting box is flush with the right side face of the housing, and a rear side face of the mounting box is flush with the rear side face of the housing;
wherein an earpiece connected to the mainboard is arranged on a side face of the mounting box facing the screen, and a gap communicating with the earpiece is defined on a top face of the mounting box and is adjacent to the earpiece, such that sounds of the earpiece is transmitted from the gap without extending the mounting box out of the receiving groove.

11. The mobile terminal of claim 10, wherein the earpiece, the first camera, and the second camera are misaligned.

12. The mobile terminal according to claim 1, further comprising a driving device configured to drive the mounting frame to extend out of or retract into the receiving groove.

13. The mobile terminal according to claim 12, wherein the driving device comprises:
a driving member, fixed in the housing and connected to the mainboard; and
a transmission rod, arranged on the driving member and extending along an extending-retracting direction of the mounting frame and defining a spiral slot;
wherein the mounting frame comprises an extension strip extending along the extending-retracting direction of the mounting frame, a protrusion is arranged on the extension strip, the protrusion is accommodated in the spiral slot and configured to slide along the spiral slot;
wherein the driving member drives the transmission rod to rotate to drive the protrusion to slide along the spiral slot, such that the extension strip slides along the extending-retracting direction of the mounting frame to drive the mounting frame to extend out of or retract into the receiving groove.

14. The mobile terminal according to claim 12, wherein the driving device comprises:
a motor, fixed in the housing and connected to the mainboard; and
a screw bar, extending along the extending-retracting direction of the mounting frame and connected to the motor;
wherein the mounting frame defines a screw hole matching with the screw bar, such that the screw bar is screwed to the mounting frame;
the motor drives the screw bar to rotate in the screw hole to drive the mounting frame to extend out of or retract into the receiving groove.

15. The mobile terminal according to claim 12, wherein the driving device comprises:
a motor, fixed in the housing and connected to the mainboard;
a driving gear, connected to the motor; and
a rack, extending along an extending-retracting direction of the mounting frame, arranged on the mounting frame and engaging with the driving gear;
wherein the motor drives the driving gear to rotate to drive the mounting frame to extend out of or retract into the receiving groove.

16. The mobile terminal according to claim 12, wherein the driving device comprises:
an electromagnet, fixed in the housing and connected to the mainboard; and a magnet, arranged on the mounting frame and corresponding to the electromagnet;

wherein when the mainboard supplies power to the electromagnet, and magnetic poles between the electromagnet and the magnet are same, the electromagnet and the magnet are mutually repelled, such that the mounting frame is driven to extend out of the storage groove; and when the mainboard supplies power to the electromagnet and changes the power supply direction, the magnetic poles between the electromagnet and the magnet become different, the electromagnet and the magnet attract each other, such that the mounting frame is driven to retract into the receiving groove.

17. The mobile terminal according to claim 12, wherein the driving device comprises:

a motor fixed in the housing and connected to the mainboard;

a driving gear connected to the motor;

a transmission rod, adjacent to the motor and extending along an extending-retracting direction of the mounting frame; and a connecting rod, adjacent to the transmission rod and configured to slide along the extending-retracting direction of the mounting frame;

a driven gear, arranged on an end of the transmission rod and engaging with the driving gear;

wherein a spiral slot extending along the extending-retracting direction of the mounting frame is defined on an outer peripheral wall of the transmission rod;

a top end of the connecting rod is connected to the mounting box; and a sliding block is arranged on a bottom of the connecting rod, the sliding block is accommodated in the spiral slot and configured to slide along the spiral slot.

18. The mobile terminal according to claim 12, wherein the driving device comprises:

an elastic member, elastically coupled between the housing and the connecting frame;

a guiding bar, arranged on the mounting frame along an extending-retracting direction of the mounting frame; and a limiting mechanism, comprising:
 a rotating member, rotatably connected to the housing;
 a pressing member, rotatably connected to an end of the rotating member, wherein an end of the pressing member away from the rotating member extends out of the housing;
 a limiting sliding block, rotatably connected to the other end of the rotating member away from the pressing member and configured to limit the guiding bar; and
 an elastic member, connected to the limiting sliding block and configured to force the limiting sliding block to resume an original position;

wherein the pressing member is pressed to drive the rotating member to rotate such that the guiding bar disengages from the limitation of the limiting sliding block, the elastic member resumes from deformation to push the mounting frame to extend out of the receiving groove.

19. A mobile terminal, comprising:

a back shell, defining an accommodating opening on a top of the back shell;

a front shell, comprising a pair of spaced and parallel walls engaged with the back shell to define a chamber, wherein the front shell has a top connected with the walls and lower than a top of the back shell;

a mainboard, received in the chamber;

a screen, embedded in the front shell and having a display area, wherein the top of the front shell is lower than the top of the screen, such that a storage space is defined by a top of the front shell, the screen and the back shell, the chamber and the storage space are divided by the top of the housing;

a slidable device, received in the storage space and configured to move between a first position at which the slidable device extends out of the storage space and a second position at which the slidable device retracts into the storage space;

wherein a first camera is arranged on a face of the slidable device facing the screen and connected with the mainboard, when the slidable device is at the first position, the first camera is exposed out of the storage space; when the slidable device is at the second position, the slidable device is covered by the display area and the first camera is received in the storage space; and a second camera is arranged on a face of the slidable device facing the back shell and connected to the mainboard, when the slidable device is at the first position, the second camera is exposed out of the storage space, when the slidable device is at the second position, the second camera is accommodated in the accommodating opening and exposed out of the back shell through the accommodating opening; and a driving mechanism, connected to the mainboard, received in the chamber and configured to drive the slidable device with the first and second cameras to move between the first position and the second position.

20. An electronic apparatus, comprising:

a housing comprising a pair of spaced and parallel walls and a top connected with the walls; and a screen engaged with the walls to define a chamber, wherein the screen has a top extending beyond the top of the housing such that a storage space is defined by the top of the housing and the screen;

a mainboard received in the chamber; and a slidable device received in the storage space and configured to move between a first position at which the slidable device extends out of the storage space and a second position at which the slidable device retracts into the storage space;

wherein a first camera is arranged on the slidable device and connected to the mainboard, when the slidable device is at the first position, the first camera is exposed out of the storage space; when the slidable device is at the second position, the slidable device is covered by the display area and the first camera is received in the storage space; and a second camera is arranged on a face of the slidable device facing away from the screen and connected to the mainboard, the second camera is exposed out of the housing regardless of whether the slidable device is at the first position or the second position.

* * * * *